S. M. CRADDOCK.
VETERINARY SURGICAL APPLIANCE.
APPLICATION FILED MAR. 18, 1920.
1,388,172.
Patented Aug. 23, 1921.
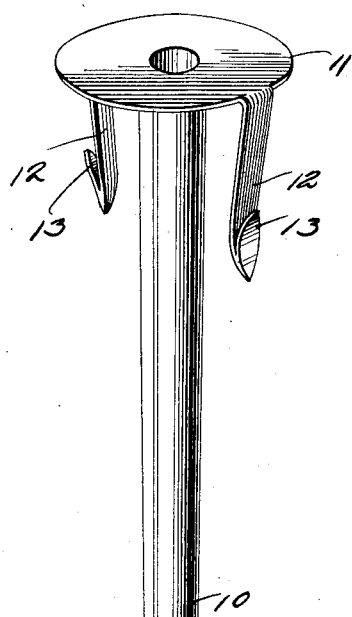
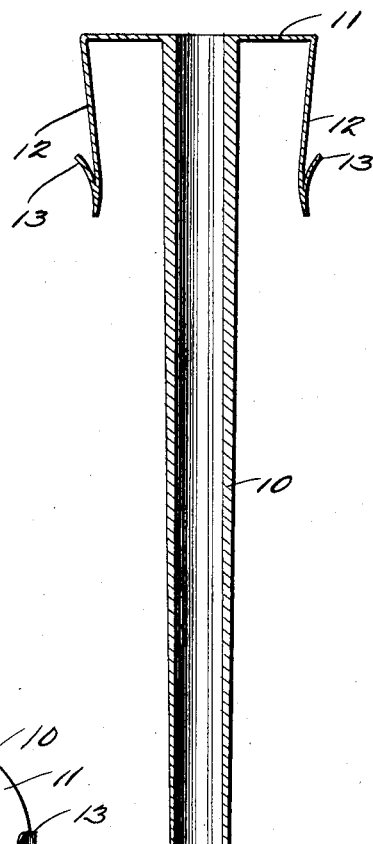
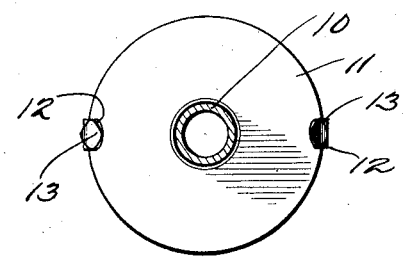
Inventor
Simon M. Craddock
Attorneys

UNITED STATES PATENT OFFICE.

SIMON M. CRADDOCK, OF ROOSEVELT, OKLAHOMA.

VETERINARY SURGICAL APPLIANCE.

1,388,172.　　　Specification of Letters Patent.　　Patented Aug. 23, 1921.

Application filed March 18, 1920.　Serial No. 366,895.

*To all whom it may concern:*

Be it known that I, SIMON M. CRADDOCK, a citizen of the United States, residing at Roosevelt, in the county of Kiowa, State of Oklahoma, have invented certain new and useful Improvements in Veterinary Surgical Appliances; and I do hereby declare the following to be a full, clear, and exact description of the invention, such as will enable others skilled in the art to which it appertains to make and use the same.

This invention relates to new and useful improvements in veterinary surgical instruments, and particularly to devices for use in relieving cattle of bloat.

When cattle gorge on alfalfa clover, and especially when it is moist after a light rain or heavy dew, the alfalfa in the stomachs of the animals ferments rapidly, with the result that much gas is formed and the stomachs greatly distended. This causes pain to the cattle, and frequently death. It is the especial object of the present invention to provide an instrument which is to be introduced into the flank of the animal and through the wall of the stomach for the purpose of establishing an outlet for the gases of fermentation.

It is a further object to provide a novel and improved device which is adapted to be inserted through the abdominal and stomach walls of the animal and left in such position for an indefinite period of time, or for such time as will relieve the animal of the pressure of the gases due to fermentation.

Other objects and advantages will be apparent from the following description when taken in connection with the accompanying drawing.

In the drawing:

Figure 1 is a perspective view of the invention.

Fig. 2 is a longitudinal central sectional view through the device.

Fig. 3 is a transverse sectional view through the device.

In the treatment of cattle for bloat, due to the formation of gases in the stomach after eating moist alfalfa clover, a trocar and canula are used to pierce the side of the animal just in advance of the flank and through the wall of the stomach. When the spear or the trocar is withdrawn from the canula the gases pass out through the canula to the outside atmosphere. The canula is allowed to remain in the animal's side for a period sufficient to permit the proper exhaustion of the gases, after which some medicament is introduced through the opening thus formed, into the stomach for the purpose of allaying or overcoming the tendency to fermentation. Bloat is liable to occur again, with the result that the operation above described, must again be resorted to. It is the especial object of the present invention to provide a novel and improved device which is adapted to be inserted through the opening formed by the trocar and canula, and secured in such position that when gases form in the stomach they can readily escape from the animal's stomach and maintain the animal in a comfortable condition.

Referring particularly to the accompanying drawing, 10 represents a tapered tubular member which is of the approximate diameter or caliber and length as that of the ordinary trocar and canula, said member having a bore formed therethrough, and having a diskal flange 11 on its larger end. Carried by diametrically opposite sides of the disk, and extending longitudinally of the member 10, in a direction toward the smaller end thereof, and with a slight cant outward away from the body of the member, are two resilient fingers 12, each having on its free end a prong or barb 13.

In the use of the device, an opening is formed in the abdominal and stomach walls of the animal, and after the trocar and canula have been removed, the device, which forms the subject-matter of the present application, is inserted therein, the smaller end thereof being introduced first. When the device has been passed into the stomach and the fingers have entered the outer end of the opening, the disk will press against the outer face of the animal's skin, while the barbs or prongs will enter the tissue within the opening. The device is permitted to remain in the animal's body and stomach until the animal has been relieved of the gases of fermentation, and proper medical treatment applied through the device into the stomach, to allay or cure the act or process of fermentation, after which the device is removed. If, however, the animal displays a tendency toward bloat every time that it eats to excess, or not, of moist alfalfa clover, the device is permitted to remain in the animal's side, with the result that as fast as the gases accumulate in the stomach, they can readily escape through the bore of the device. The barbs or prongs of the fingers effectively retain the device in the animal's side so that it cannot be dislodged should the animal rub its body against a tree, fence, or other object, or should the animal lie down.

What is claimed is:

A device for the relief of bloat in cattle comprising an elongated and tapered body having a longitudinal central bore therethrough, said body being adapted to be inserted with its smaller end first through an opening in the abdominal and stomach walls of an animal formed by means of a trocar, the larger end of the body being formed with a diskal flange, and longitudinal fingers on the flange extending in a direction toward the said smaller end of the body, the free ends of the fingers being provided with barbs for penetration in the tissues of the opening in the animal's body.

In testimony whereof, I affix my signature in the presence of two witnesses.

SIMON M. CRADDOCK.

Witnesses:
L. C. CHEUVRONT,
BEN NANCE.